United States Patent [19]

Hirth et al.

[11] Patent Number: 4,698,819

[45] Date of Patent: Oct. 6, 1987

[54] POWER SUPPLY UNIT FOR A LASER TUBE

[75] Inventors: Antoine Hirth, Hegenheim; Antoine Simon, St. Louis, both of France

[73] Assignee: Institut Franco-Allemand de Recherches de Saint-Louis, St. Louis, France

[21] Appl. No.: 842,502

[22] Filed: Mar. 21, 1986

[30] Foreign Application Priority Data

Mar. 22, 1985 [FR] France ................................ 85 04285

[51] Int. Cl.⁴ .............................................. H01S 3/00
[52] U.S. Cl. ...................................... 372/38; 372/25; 372/86
[58] Field of Search .............................. 372/38, 86, 25

[56] References Cited

U.S. PATENT DOCUMENTS 4,549,091 10/1985 Fahlen ................................... 372/25
4,591,761 5/1986 Gregorich et al. .................... 372/25
4,627,063 12/1986 Hosakawa .............................. 372/25

Primary Examiner—Leon Scott, Jr.
Attorney, Agent, or Firm—Armstrong, Nikaido, Marmelstein & Kubovcik

[57] ABSTRACT

The power supply of a laser tube which, according to the invention comprises devices for pulse formation and means for pulse triggering and is characterized in that it contains a pre-ionization circuit (4, 6) to form a pre-ionization pulse, and an excitation circuit (17, 22) to form an excitation pulse, and devices for synchronization (15) of the pre-ionization pulse and the excitation pulse.

10 Claims, 2 Drawing Figures

POWER SUPPLY UNIT FOR A LASER TUBE

FIELD OF THE INVENTION

The present invention relates to a power supply unit for a laser tube, especially for a tube of gas lasers or metal vapour lasers.

BACKGROUND OF THE INVENTION

It is known that for the use of a laser tube it is necessary to proceed first to a pre-ionization of the laser medium and then excite the laser by a high-performance pulse which is fed into the pre-ionized plasma. This is done in a time interval during which a population inversion can be reached, i. e. a molecule displacement to an excited state in which the number of excited molecules is greater than that of molecules at lower energy level. The laser emission is provoked when the excited molecules fall back to their low energy level.

In the case of gas lasers with transverse excitation, e.g. excimer lasers, x-rays or ultraviolet rays are often used to pre-ionize the laser medium. However, the devices for pre-ionization by means of x-rays or UV-rays are expensive and necessitate a large place for the installation. Moreover, in the case of metal vapour lasers it is not possible to use a pre-ionization by means of x-rays of UV-rays because of the high discharge frequency (1 to 100 kHz), the low discharge current (100 to 1000 A) and the longitudinal type of excitation, i.e. the application of an electric field parallel to the output direction of the laser beam. With lasers of this type preionization is made by using part of the electric discharge. During the pre-ionization the energy yielded by an oscillating circuit is partly stored in a capacitor, which is discharged into the laser tube when the discharge in the latter begins. However, the discharge of the storage capacitor cannot be controlled, and so it can happen that at the moment of discharge the plasma is not sufficiently pre-ionized. In this case the impedance of the laser tube is not favorable for optimization of the discharge parameters as, for example, the electric field (optimum between 100 and 200 V/cm) or the energy density fed into the plasma (optimum 1 mJ/cm$^3$).

Moreover, if a high laser performance is to be reached with metal vapour lasers, it is necessary to increase the volume of the laser tube. It can then be observed that the output of laser energy per volume unit of the plasma decreases. In that case the following phenomena are observed:

(a) the volume recombination in the plasma takes longer time and it becomes necessary to use lower discharge frequencies. This brings about a loss of the residual pre-ionization which normally results from the repetition frequency. Therefore, the time until the discharge is built-up in the tube becomes increasingly longer;

(b) the excitation circuit has to yield a performance which is proportional to the volume of the tube. This is incompatible with the reduction of the discharge frequency;

(c) if the dimensions of the laser tube are incresed the tube inductance increases and the resistnce decreases. As a result of this the current rise time increases and is then generally longer than the maximal time interval of about 50 ns during which the population inversion can be maintained.

SUMMARY OF THE INVENTION

One of the objectives of the invention is to propose a device for the current supply of a laser tube, preferably a gas laser tube, which allows an adequate pre-ionization of the laser medium and a discharge with rapid excitation in the laser tube.

In order to attain this objective, the invention provides a device for the current supply of a laser tube with means for pulse formation and pulse triggering, characterized in that it comprises a pre-ionization circuit to form a pre-ionization pulse, an excitation circuit to form an excitation pulse and means for synchronizing the pre-ionization pulse and the excitation pulse.

Thus, the pre-ionization pulse brings the tube into a favourable state and the excitation pulse guarantees in the laser medium a population inversion in the necessary time interval.

According to a prefered embodiment of the invention, the synchronization devices comprise a triggerable switch between the pre-ionization circuit and the excitation circuit.

Thus, the moment for the excitation discharge is simply determined by the triggering of the switch.

According to a preferred embodiment of the invention the triggerable switch is a magnetically operated switch. Thus, the triggering of the switch is automatically done by saturation of the core of this switch.

According to another preferred aspect of the invention regulation devices for the reset current of the magnetically operated switch are provided. Thus, the moment for triggering the excitation pulse of the laser tube can be easily adapted to the operating conditions of this laser tube by appropriate determination of the reset current.

In a first advantageous example of a realization the device for current supply comprises an inductance and a blocking diode which are common to the pre-ionization circuit and the excitation circuit. The pre-ionization circuit contains a pre-ionization capacitor the first terminal of which is connected with the common blocking diode and the pulse trigger devices via a pre-ionization inductance. A second terminal connected to a terminal of the laser tube is connected with an impedance parallel to the laser tube and with a first terminal of the magnetically operated switch. The excitation circuit comprises a first excitation capacitor the first terminal of which is connected with the common blocking diode via an excitation inductance, and a second terminal which is connected with a second terminal of the magnetically operated switch and a second excitation capacitor connected parallel to the laser tube. Thus, in the pre-ionization phase the pre-ionization capacitor sends a pre-ionization pulse into the laser tube, whereas the first excitation capacitor yields its energy to the second excitation capacitor, and in the excitation phase the second excitation capacitor sends an excitation pulse as soon as the core of the magnetically operated switch is saturated.

In a further advantageous example of realization of the invention the pre-ionization circuit comprises a primary winding of a voltage-increasing transformer with saturable core. This primary winding is connected with a first terminal to the pulse forming devices, and with a second terminal to a terminal of the laser tube, to an impedance parallel to the laser tube and to a first terminal of the triggerable switch. The excitation circuit comprises a secondary winding of the transformer with saturable care which is in series with an inductance that is connected with a second terminal of the triggerable switch, and a second terminal which is connected with a second terminal of the laser tube. Thus, the passage of the pre-ionization current through the primary winding of the transformer with saturable core brings about a reset of the magnetically operated switch and a continuous desaturation of the transformer core, so that at the end of the pre-ionization pulse the excitation circuit is ready to send an excitation pulse to the laser tube.

DESCRIPTION OF THE DRAWINGS

Further characteristics and advantages of the invention result from the following description of not exhausting examples in the annexed drawings.

DESCRIPTION OF THE PREFERRED EMBODIMENTS

Figure 1:
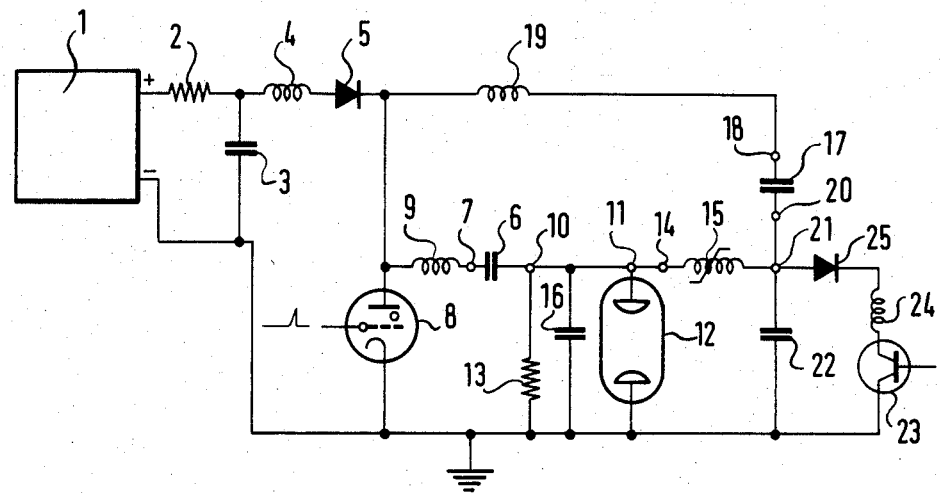
FIG. 1 ist a schematic representation of a first example of realization of the invention.

In FIG. 1 the power supply unit comprises in a classical way a dc-generator 1 behind which a filter circuit is mounted consisting of an impedance 2 and a capacitor 3. Behind the filter circuit 2, 3, the device contains an inductance 4 and a blocking diode 5 common to a pre-ionization circuit and an excitation circuit. The pre-ionization circuit contains a pre-ionization capacitor 6 whose first terminal 7 is connected with the common inductance 4 and with the pulse triggering devices 8, e.g. a thyrathron via a pre-ionization coil 9, and a second terminal 10, which is connected with a first terminal 11 of a laser tube 12, with a first terminal 14 of a magnetically operated switch 15 and an impedance 13 which is connected in parallel with the laser tube 12. The second terminal of the laser tube is connected with the second terminal of the parallel inductance 13 and with the pulse triggering device 8 via a common ground.

In the represented preferred realization example the pre-ionization circuit also comprises a storage capacitor 16 which is parallel to the laser tube 12 and to the parallel impedance 13.

The excitation circuit contains a first excitation capacitor 17 whose first terminal 18 is connected with the common inductance 4 by means of an excitation inductance 19 and a second terminal 20 which is connected with a second terminal 21 of the magnetically operated switch 15 and with a second excitation capacitor 22 parallel to the laser tube 12.

Thus, the magnetically operated switch 15 represents a triggerable switch which separates the pre-ionization circuit from the excitation circuit and constitutes thus synchronization devices for the pre-ionization-pulse and the excitation pulse, as will be shown later on when the function of this type of realization is explained.

The setup also comprises devices for regulating the reset current of the magnetically operated switch 15. These devices for regulating the reset current contain a circuit with variable impedance in derivation to the magnetically operated switch which, for example contains a transistor 23 protected by an inductance 24 and a diode 25 which are in series with the emitter and the collector of the transistor 23.

This first realization example functions as follows: during the time in which the thyrathron 8 is not triggered. i.e. during the time interval which separates the pulses on its grid, the pre-ionization capacitor 6 is charged by the dc generator 1; the connection back to ground is assured by the parallel impedance 13. The excitation capacitor 17 is also charged, the current return being assured by the switch 15 and the parallel impedance 13 as well as by the diode 25, the inductance 24, and the transistor 23. In this respect it must be noted that the charge current of the excitation capacitor 17 causes at the same moment the reset of the switch 15, thus opening it by desaturation of its magnetic core. Besides, it is known that the instant of closing of the magnetically operated switch 15 is governed by several factors, namely the inherent parameters of the magnetic circuit (cross-sectional area, number of windings, length of magnetic circuit), the law of voltage variation at its terminals, the variation of the magnetic induction of the core between the moment of reset and the moment of saturation. The variation of the magnetic induction itself depends on the reset current. Taking into account the fact that the inherent parameters are fixed by the construction, and that the voltage variation is equally determined by the total circuit, it becomes clear the closing moment of the switch 15 is solely determined by the reset current. This reset current according to an aspect of the invention is determined by partial derivation of the charge current of the capacitor 17 into the variable impedance in derivation which is formed by the transistor 23 which is protected by the inductance 24 and the diode 25. Therefore, it becomes clear, that the part of the current, which enters the transistor 23 does not enter the magnetically operated switch 15. Thus, the variation of the magnetic induction of the core of the magnetically operated switch 15, i.e. its moment of closing, is determined by the gain of the transistor 23.

When there is a pulse on the grid of the thyrathron 8 the switch closes thereby causing a pre-ionization-pulse by the discharge of the pre-ionization capacitor 6 which is slowed down by the inductance 9. At the beginning of the discharge the laser tube 12 has a very high impedance and the energy delivered by the pre-ionization capacitor 6 is partly stored in the storage capacitor 16. If the laser tube 12 has partially become conducting the storage capacitor 16 is rapidly discharged into the laser tube 12 due to the reduced inductance of the circuit which connects the storage capacitor 16 with the laser tube 12, and thereby completes the pre-ionization of the laser tube 12.

Parallel to the pre-ionization of the laser tube 12, the closing of the thyrathron 8 brings about the charge transfer from the first excitation capacitor 17 to the second excitation capacitor 22. In this respect, it must be noted, that the first excitation capacitor 17 and the second excitation capacitor 22 should preferably have the same or a similar capacity. Charge transfer from the excitation capacitor 17 to the excitation capacitor 22 is relatively slow, due to the inductance 19.

If the voltage at the terminals of the second excitation capacitor 22 is sufficiently high, and if at the terminals of the tube is sufficiently low, i.e. at the end of the pre-ionization-discharge, a current begins to flow through the magnetically operated switch 15. If the core of the magnetically operated switch 15 is saturated, the magnetically operated switch is closed, i.e. its inductance is much less than that of the laser tube 12. The excitation capacitor 22 then discharges abruptly into the laser tube 12 and provokes the excitation pulse.

It can therefore be observed that the synchronization of the pre-ionization-pulse and the excitation pulse is obtained by triggering the magnetically operated switch 15, and especially, due to the characteristics of this swtich, by determining its reset current. It can also be seen that the two inductivities 9 and 19 do not only slow down the current rise in the circuit in which they are integrated, thereby protecting the thyrathron 8, but also allow a gross regulation of the synchronization of pre-ionization-pulse and excitation pulse.

Figure 2:
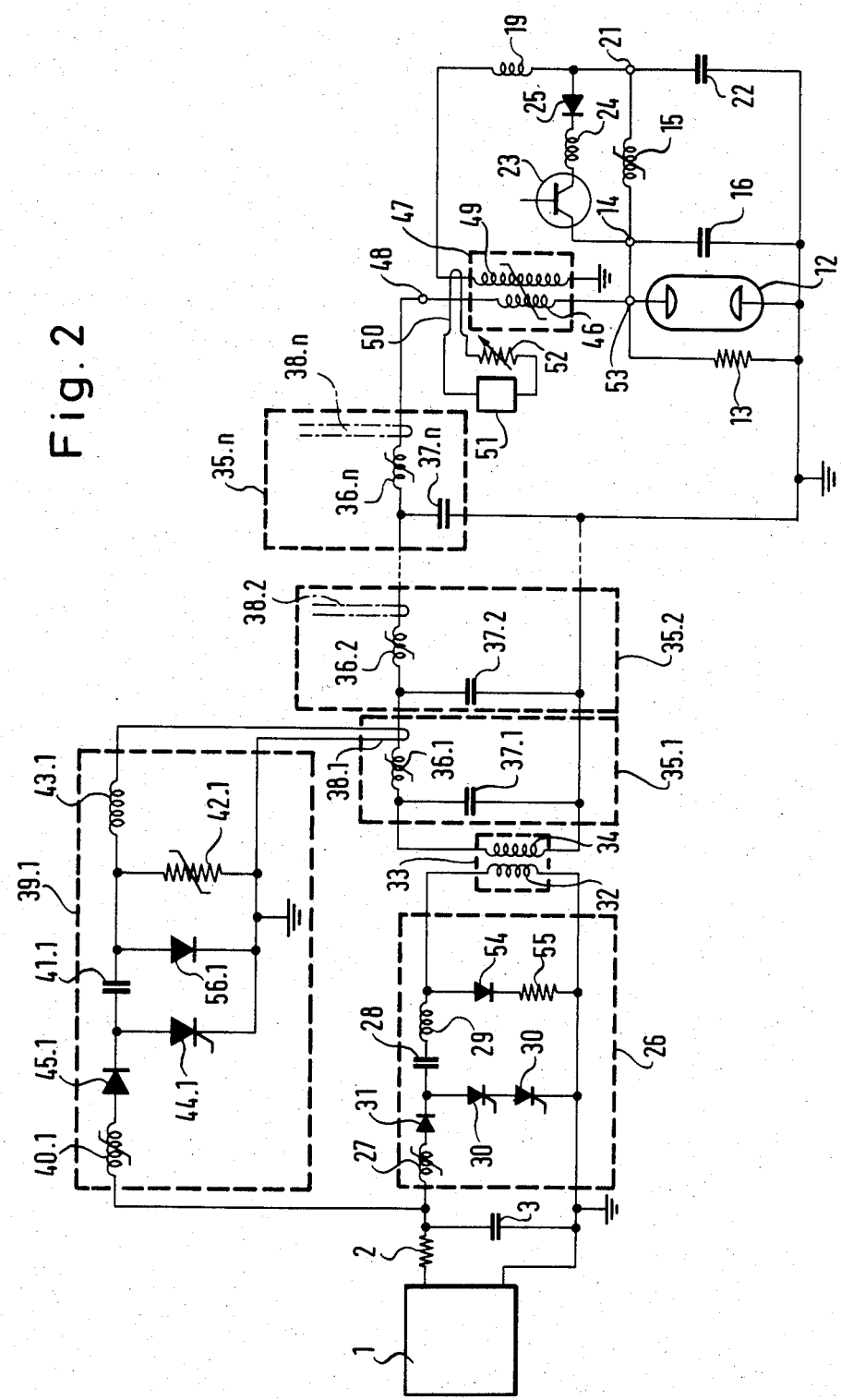
FIG. 2 is a schematic representation of a second example of realization of the invention.

FIG. 2 shows another example of realization of the invention. In this example of realization the same reference numbers are used for the same elements described above.

As in the previous case the setup comprises a dc generator 1, which is set before a filter circuit, consisting of an impedance 2 and a capacitor 3. The dc supply thus realized is connected to a low-voltage resonant circuit, generally numbered 26 and which contains, in a well-known manner, a saturable resonant charge 27, a blocking diode 31, a capacitor 28, an inductance 29, pulse triggering thyristors 30 (preferably several thyristors 30 are used to reduce the difference in potential to which any of them is subjected), a blocking diode 54 and a protecting impedance 55. The low-voltage resonant circuit 26 is connected with a primary winding 32 of a voltage-increasing transformer whose secondary winding is connected with a series of pulse compression stages in cascade mounting 35.1,35.2, . . . 35.n. The compression stage 35.1 contains a magnetically operated switch 36.1 with a capacitor 37.1 to form a high-voltage resonant circuit, which compared to the pulse transmitted by the secondary winding 34 of the transformer 33, delivers a shorter pulse.

The magnetically operated switch 36.1 contains a reset loop 38.1, which is connected with a reset circuit 39.1. The reset circuit 39.1 contains in a well-known manner a saturable resonant charge 40.1, a blocking diode 45.1, a capacitor 41.1, a variable impedance 42.1, an inductance 43.1, a thyristor 44.1 for triggering the reset pulse and a charge diode 56.1.

Every succeeding compression stage in cascade mounting has a structure analog to the compression stage 35.1, but the gain is reduced from stage to stage in order to obtain a suffiently high energy transfer from stage to stage, and at the same time the compression of the high-voltage pulse takes place. The number of stages is determined as a function of the duration of the original pulses, the final pulse delivered by stage 35 n being determined by the characteristics of the laser tube 12. Especially for a gas laser the number n of compression stages is determined such that the final pulse has a duration of about 150–200 ns.

In this example of realization the pre-ionization-circuit contains a primary winding 46 of a voltage-increasing transformer with saturable core 47 this primary winding 46 is connected with a first terminal 48 to the output terminal of the last magnetically operated switch 36.n of the pulse forming devices, and with a second terminal 53 to a terminal of the laser tube 12 an impedance (13) parallel to the laser tube (12) and a first terminal 14 of the magnetically operated switch 15. The excitation circuit contains a secondary winding 49 of the transformer 47 in series with a excitation inductance 19, which is connected to a second terminal 21 of the magnetically operated switch 15, and a excitation capacitor 22 whose first terminal is connected with the second terminal 21 of the magnetically operated switch 15, and a second terminal, which is connected with the second terminal of the laser tube 12 via the common ground.

Just as before the circuit comprises a derivation loop of the reset current of the magnetically operated switch 15. This loop contains a transistor 23 whose emitter-collector connection is in series with an inductance 24 and a diode 25. The transformer with saturable core 47 contains a saturation loop 50, which is continuously fed by a dc generator 51, and the current in the loop 50 is regulated by a variable resistance 52.

This second example of realization functions as follows: If there is no pulse triggering by the thyristor 30 the direct current running trough the saturation loop 50 saturates the core of the transformer 47, so that the primary winding 46 and the secondary winding 49 are separated. If a pulse is triggered by the thyristor 30 it runs first into the transformer 33 and into the compression stages 35.1. 35.2, . . . 35.n and then closes successively the magnetically operated switches 36.1, 36.2, . . . 36.n. At the closing moment of the magnetically operated switch 36.n the capacitor 37.n begins to discharge into the laser tube 12 thereby assuring its pre-ionization and at the same time provokes the reset of the magnetically operated switch 15. Therefore the reset current passes through the magnetically operated switch 15 and the transistor 23 into the derivation loop, the excitation inductance 19 and the secondary winding 49. The pre-ionization-current which is higher than the current in the loop 50 equally assures the desaturation of the saturable core of the transformer 47. When the transformer 47 is desaturated the greatest part of the energy staying in the capacitor 37.n is used to charge the excitation capacitor 22 to a voltage in the transformation ratio of the transformer 47. When the voltage of the excitation capacitor 22 rises above that of the laser tube 12, a current begins to flow through the magnetically operated switch 15, until the moment when it closes, thus allowing the very rapid discharge of the excitation capacitor 22 into the laser tube 12 and thereby provokes the excitation pulse.

As in the first example of realization, in this example of realization the closing moment of the magnetically operated switch 15 is regulated in advance by the reset current of the magnetically operated switch 15, which itself is determined by the impedance of the transistor 23.

It can be observed that this second example of realization can only be realized by semi-conductor devices as substitute for the thyrathron 8 of the first realization example, and that it is therefore more economical that the first realization example because the components have a longer life.

Naturally, the invention is not limited to the two realization examples described above, and other variations of realizations are possible, too. Especially, the magnetically operated switch 15 can be replaced by several magnetically operated switches or an equivalent triggerable switch.

In the same way the transistor 23 of the derivation loop of the reset current of the magnetically operated switch 15 can be replaced by other devices yielding a variable impedance.

We claim:

1. A power supply unit for a laser tube having a means for pulse formation and a means for pulse triggering, said power supply unit comprising:

a pre-ionization circuit means to form a pre-ionization pulse;

an excitation circuit means to form an excitation pulse; and a synchronization device having a switch, said synchronization device located between said pre-ionization circuit means and said excitation circuit means, said synchronization device synchronizes the pre-ionization pulse and the excitation pulse when said switch is enabled.

2. A power supply unit of a laser tube according to claim 11, wherein the synchronization device contains a triggerable switch which separates the pre-ionization circuit from the excitation circuit means.

3. A power supply unit according to claim 1, wherein the switch is a magnetically operated switch.

4. A power supply unit according to claim 3, further including regulation devices which generate a reset current to reset the magnetically operated switch.

5. A power supply unit according to claim 4, wherein the regulation devices of the reset current contain a current circuit with a variable impedance which is situated in a current deviation loop connected to the magnetically operated switch.

6. A power supply unit according to claim 5, wherein the current circuit with said variable impedance contains a first transistor protected by a first inductance and a diode in series with the first transistor.

7. A power supply unit according to claim 4, further containing a second inductance and a common blocking diode, both being situated in the pre-ionization circuit means and in the excitation circuit means, and the pre-ionization circuit means containing a pre-ionization capacitor whose first terminal is connected with the common blocking diode and a pulse triggering device via pre-ionization inductance, and whose second terminal is connected with a terminal of the laser tube, said pre-ionization circuit further including a first impedance parallel to the laser tube connected with a first terminal of the magnetically operated switch, the excitation circuit means containing a first excitation capacitor whose first terminal is connected with the common blocking diode via an excitation inductance, and whose second terminal is connected with a second terminal of the magnetically operated switch and with a second excitation capacitor which is connected parallel to the laser tube.

8. A power supply unit according to any one of claims 2 to 6, wherein the means for pulse formation contains a low-voltage resonant circuit which is connected with a primary winding of a voltage-increasing transformer and contains a series of pulse compression stages which are connected with a secondary winding of the transformer, and wherein the means for pulse triggering are integrated into the low-voltage resonant circuit.

9. A power supply unit according to claim 8, wherein each compression stage contains a resonant circuit, which contains a capacitor and a magnetically operated switch with a reset looop.

10. A power supply unit according to claim 9, wherein the pre-ionization circuit means contains a primary winding of a voltage-increasing transformer with a saturable core, whose first terminal is connected with the means for pulse formation, and a second terminal which is connected with a terminal of the laser tube and with an impedance which is connected parallel to the laser tube, the second terminal also being connected with a first terminal of the triggerable switch, and wherein the excitation circuit means comprises a secondary winding of the transformer with saturable core in series with an excitation inductance which is connected with a second terminal of the triggerable switch, and a capacitor whose first terminal is connected with the second terminal of the triggerable switch, and whose second terminal is connected with a second terminal of the laser tube.

* * * * *